United States Patent
Ikeda (10) Patent No.: US 6,840,112 B2
(45) Date of Patent: Jan. 11, 2005

(54) DIFFERENTIAL PRESSURE/PRESSURE TRANSMITTER

(75) Inventor: Isamu Ikeda, Tokyo (JP)

(73) Assignee: Yamatake Corporation, Tokyo (JP)

( * ) Notice: Subject to any disclaimer, the term of this patent is extended or adjusted under 35 U.S.C. 154(b) by 1 day.

(21) Appl. No.: 10/739,239

(22) Filed: Dec. 17, 2003

(65) Prior Publication Data

US 2004/0129084 A1 Jul. 8, 2004

(30) Foreign Application Priority Data

Dec. 27, 2002 (JP) ........................................ 2002-382336

(51) Int. Cl.$^7$ .............................................. G01L 7/00
(52) U.S. Cl. ........................................................ 73/756
(58) Field of Search ..................... 73/706, 756; 137/15, 137/271, 512, 527

(56) References Cited

U.S. PATENT DOCUMENTS 5,385,166 A * 1/1995 Dunmire et al. ......... 137/15.08

FOREIGN PATENT DOCUMENTS

| JP | 61-112248 A | 7/1986 |
|---|---|---|
| JP | 04-291128 A | 10/1992 |
| JP | 09-318479 A | 12/1997 |

* cited by examiner

Primary Examiner—William Oen
(74) Attorney, Agent, or Firm—Blakely Sokoloff Taylor & Zafman (57) ABSTRACT

A differential pressure/pressure transmitter includes a detecting section, a transmitting section, and a pair of pressure introducing covers. The detecting section has a pair of barrier diaphragms in its opposing side surfaces, and detects a differential pressure of a to-be-measured fluid applied to the pair of barrier diaphragms. The transmitting section is attached to the detecting section. The pressure introducing covers have pressure introducing holes for guiding pressure to the pair of barrier diaphragms, and hold the two side surfaces of the detecting section, thus covering the pair of barrier diaphragms. The detecting section is held by the pair of pressure introducing covers such that its angle is changeable about a center axis thereof. The transmitting section is attached such that its angle can be changed about a center axis thereof which is perpendicular to the center axis of the detecting section.

10 Claims, 8 Drawing Sheets

DIFFERENTIAL PRESSURE/PRESSURE TRANSMITTER

BACKGROUND OF THE INVENTION

The present invention relates to an on-site installation type differential pressure or pressure indicating transmitter (to be generally referred to as a differential pressure/pressure transmitter hereinafter) to be used in various types of plates such as petrochemical, chemical, power, gas, food, and steel plants and, more particularly, to a differential pressure/pressure transmitter that can change the attaching angle and direction with respect to process fluid supply pipelines, the reading direction of the indicator (meter), and the like freely in accordance with the situation of the installation site.

In general, a differential pressure/pressure transmitter to be installed on site is constituted by a detecting section (pressure-receiving section) which detects the differential pressure of a to-be-measured fluid applied to a pair of barrier diaphragms, and a transmitting section (converting section) which has a power supply connecting terminal block and output monitoring indicator and transmits a differential pressure signal detected by the detecting section to an internal indicator or an external device such as a controller or recorder.

The positions of the detecting and transmitting sections are determined in accordance with the piping state of the process fluid supply pipelines on site, the surrounding atmosphere of the installation side, and the like. More specifically, different piping states on site, surrounding atmospheres, and the like are coped with by separately changing the position of the detecting section itself, the connecting state of a transmitting section housing to the detecting section, the attaching angle of the indicator, the attaching position and direction of a terminal block, to which electrical wires are to be connected, with respect to the transmitting section housing, and the like.

Regarding the installation conditions of the transmitter, for example, whether the process fluid supply pipelines are arranged vertically or horizontally, on which side the high-pressure pipeline and low-pressure pipeline are located, in which direction the indicator is to be recognized visually when the pipelines are arranged along a wall, and the like change depending on sites. Hence, the positions of the indicator and terminal block with respect to the process fluid supply pipelines must be changed in accordance with these installation conditions.

Therefore, in a conventional differential pressure/pressure transmitter of this type, as described in Japanese Utility Model Laid-Open No. 61-112248 (reference 1) and Japanese Patent Laid-Open No. 4-291126 (reference 2), the housing of a transmitting section to which electrical wiring lines are to be connected is rotatably attached to the body of a detecting section which detects the differential pressure of a process fluid. A meter case is attached to the housing of the transmitting section such that its angle can be changed, and a meter is built into the meter case such that its angle can be changed in the circumferential direction. Alternatively, the type of the housing may be changed (to a product individually matching the pipelines) because it is limited by the shapes of the pressure introducing covers which are to be attached to the side surfaces of the detecting section to introduce pressure to the barrier diaphragms, or the shape of a fixing metal fixture for fixing the transmitting section to the detecting section may be changed (a special adapter is used), to cope with different installation site conditions.

The differential pressure/pressure transmitter described in reference 1 comprises a transmitter case constituted by a first cylindrical case for accommodating an amplifier unit and indicator, and a second cylindrical case for accommodating a terminal block. The second cylindrical case which has a pair of wiring line connection ports formed in its lower and side portions is connected to an obliquely lower portion of the first cylindrical case to be integral with it. The first cylindrical case is attached to the detecting section such that its attaching angle can be adjusted. The indicator is built into the first cylindrical case such that its attaching angle can be adjusted.

The differential pressure/pressure transmitter described in reference 2 comprises a detector body, a transmitting section housing to be pivotally attached to the extending end of the detector body, and a meter housing pivotally attached to a connection opening formed in the transmitting section housing. The meter is built into the meter housing such that its posture can be changed among a plurality of attaching angular positions.

In this manner, according to the differential pressure/pressure transmitters described in references 1 and 2, the posture and direction of the transmitting section and indicator with respect to the detecting section can be changed independently of each other in accordance with the piping state of the process fluid supply pipelines at the installation site.

As described above, the conventional on-site-type differential pressure/pressure transmitter is formed such that the posture and reading direction of the transmitting section housing and meter can be changed freely in accordance with the situation of the installation site. However, the attaching angle, direction, and the like of the detecting section itself cannot be changed. More specifically, according to the conventional differential pressure/pressure transmitter described above, the pair of pressure introducing covers that cover two side surfaces of the detecting section are usually fixed to a support column through brackets, and pipeline connection flanges are fixed to the upper surfaces of the respective covers. The flanges and process fluid supply pipelines are connected to each other through pipes. The process fluid from the pipelines is guided to the pressure introducing holes of the respective covers through the pipes and flanges.

Therefore, if the detecting section is to be rotated through 90° within a vertical plane so that the facing direction of the transmitting section housing may be changed from forward to upward or vice versa, it cannot be changed because the transmitting section housing abuts against the pipelines or flanges.

If the detecting section is installed sideways to have a vertical axis so that the barrier diaphragms are horizontal, when a drain stays on the surface of the barrier diaphragm that is located at an upper position, the diaphragm itself deforms due to the weight of the drain to cause a measurement error. For this reason, the detecting section must be installed such that its axis is horizontal regardless of whether the pipelines are horizontal or vertical, that is, such that the barrier diaphragms are always vertical. Accordingly, depending on the directions of the pipelines, limitations may be posed that the attaching directions of the pressure introducing covers cannot be changed.

Regarding the pair of pressure introducing covers, they are usually attached to the pipelines or support column with two bolts for each cover usually, i.e., with a total of four bolts. According to the conventional product standard, however, the pitches of bolts that are adjacent vertically and horizontally are not all equal, but four bolts form a rectangle. Therefore, installation of the detecting section must differ between a case wherein the process fluid supply pipelines are arranged horizontally and a case wherein they are arranged vertically. More specifically, in horizontal installation in which the differential pressure/pressure transmitter is to be installed for a pipe body that is usually arranged horizontally, the pair of covers are fixed to oppose each other in the axial directions of the pipe body so that the transmitting section faces forward.

In vertical installation in which the differential pressure/pressure transmitter is to be installed for a pipe body that is arranged vertically, as the barrier diaphragms must be vertical, the pair of covers must be fixed to oppose each other in a direction perpendicular to the axial direction of the pipe body. In this case, however, the covers are fixed as they are rotated through 90° with respect to the pipe body, and accordingly the positions of the bolts are inevitably shifted by 90°. Since the pressure introducing holes of the pressure introducing covers and the pressure extracting ports of the pipe body are also shifted from each other by 90°, the covers cannot be actually attached. For this reason, two different transmitters, i.e., one for vertical installation and one for horizontal installation, must be designed, or a special adapter must be used.

If the shapes of the pressure introducing covers are changed in accordance with the shapes of the pipelines or a special adapter is used, the number of types of the covers or adapters increases, so that alteration after shipping cannot be made. If spare covers and adapters are not prepared, demands from clients cannot be met.

SUMMARY OF THE INVENTION

It is an object of the present invention to provide a differential pressure/pressure transmitter in which, in addition to a transmitting section and meter, the attaching angle of a detecting section can also be changed freely in accordance with the situation of the installation site.

It is another object of the present invention to provide a differential pressure/pressure transmitter that can be installed reliably by using a simple adapter, without changing the design even when the process fluid supply pipelines are arranged in any one of the horizontal and vertical directions.

In order to achieve the above objects, according to an aspect of the present invention, there is provided a differential pressure/pressure transmitter comprising a detecting section which has a pair of barrier diaphragms in opposing side surfaces thereof and detects a differential pressure of a to-be-measured fluid applied to the pair of barrier diaphragms, a transmitting section attached to the detecting section, and a pair of pressure introducing covers which have pressure introducing holes for guiding pressure to the pair of barrier diaphragms and hold the two side surfaces of the detecting section to cover the pair of barrier diaphragms, wherein the detecting section is held by the pair of pressure introducing covers such that an angle thereof is changeable about a center axis thereof, and the transmitting section is attached such that an angle thereof can be changed about a center axis thereof which is perpendicular to the center axis of the detecting section.

DESCRIPTION OF THE PREFERRED EMBODIMENTS

Figure 1:
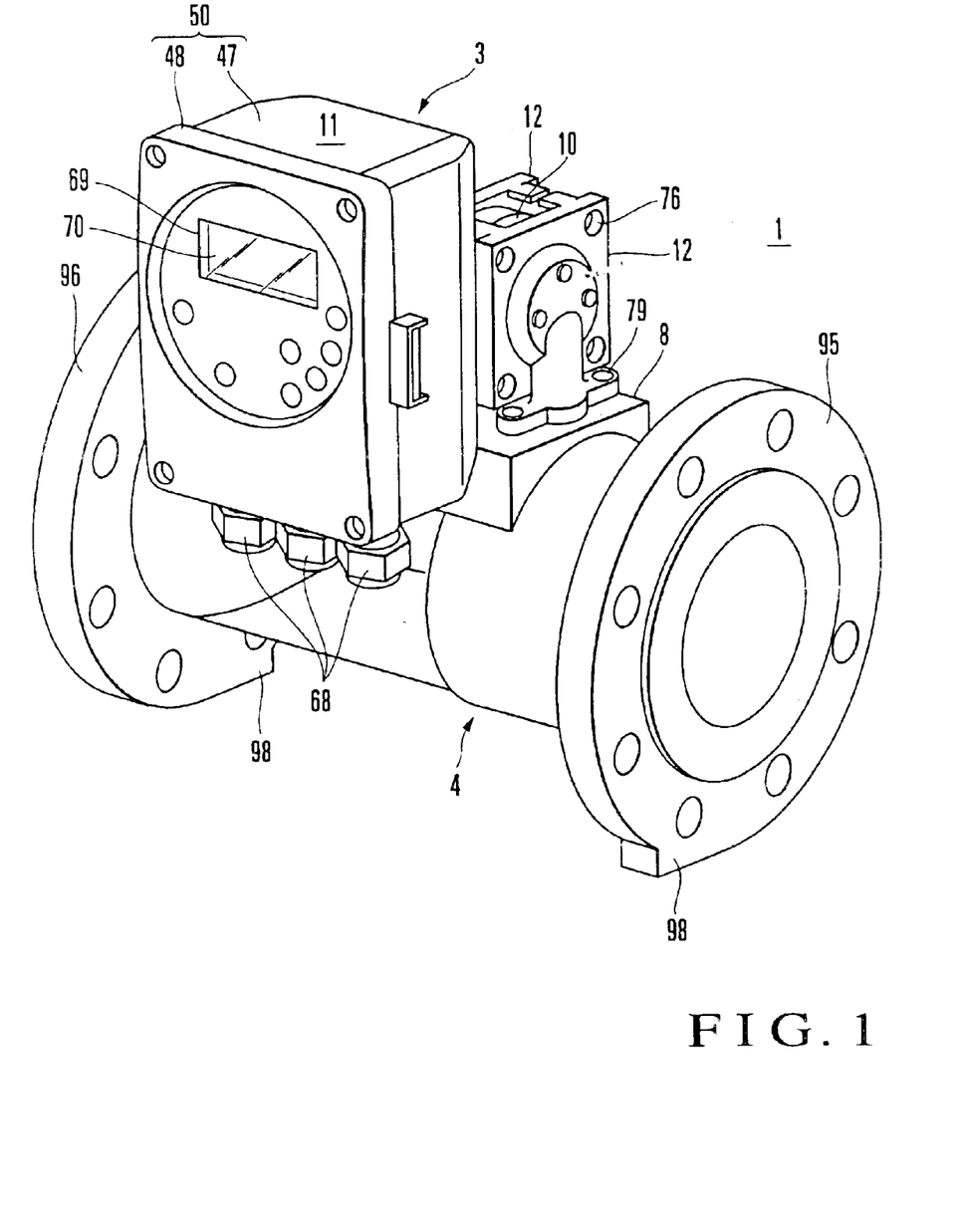
FIG. 1 is an outer appearance perspective view of a restricting flow meter according to the first embodiment of the present invention which is installed horizontally.
Figure 2:
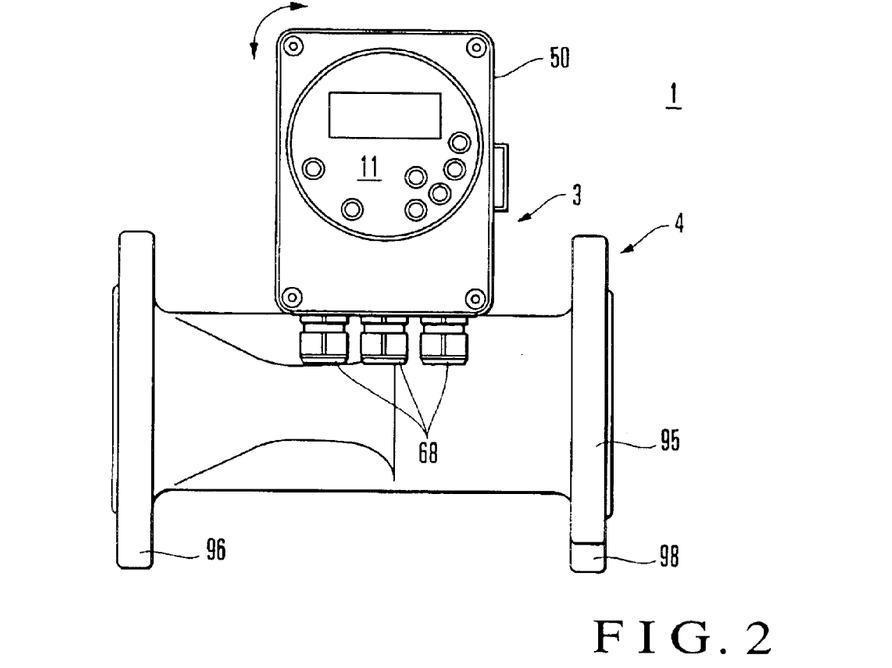
FIG. 2 is a front view of the restricting flow meter shown in FIG. 1.

FIGS. 1 to 7 show a restricting flow meter according to the first embodiment of the present invention. In this embodiment, a differential pressure/pressure transmitter is used as a restricting flow meter. This embodiment shows a case wherein a restricting flow meter 1 is installed horizontally with respect to process fluid supply pipelines (to be merely referred to as pipelines hereinafter) 2A and 2B which are arranged horizontally. As shown in FIG. 1, the restricting flow meter 1 is constituted by a pipe body 4 formed of a straight pipe, and a differential pressure transmitter 3 attached to the pipe body 4. Note that when the restricting flow meter 1 is to be installed horizontally, no adapter 5 is used.

The differential pressure transmitter 3 includes a detecting section 10 fixed to the pipe body 4, a meter-built-in transmitting section 11 pivotally attached to the detecting section 10, and a pair of pressure introducing covers 12 covering the two side surfaces of the detecting section 10. The pair of pressure introducing covers 12 are fixed to a cover fixing portion 8 on the outer surface of the tube wall of the pipe body 4 with two bolts 9 for each cover 12, i.e., with a total of four bolts 9.

Figure 5:
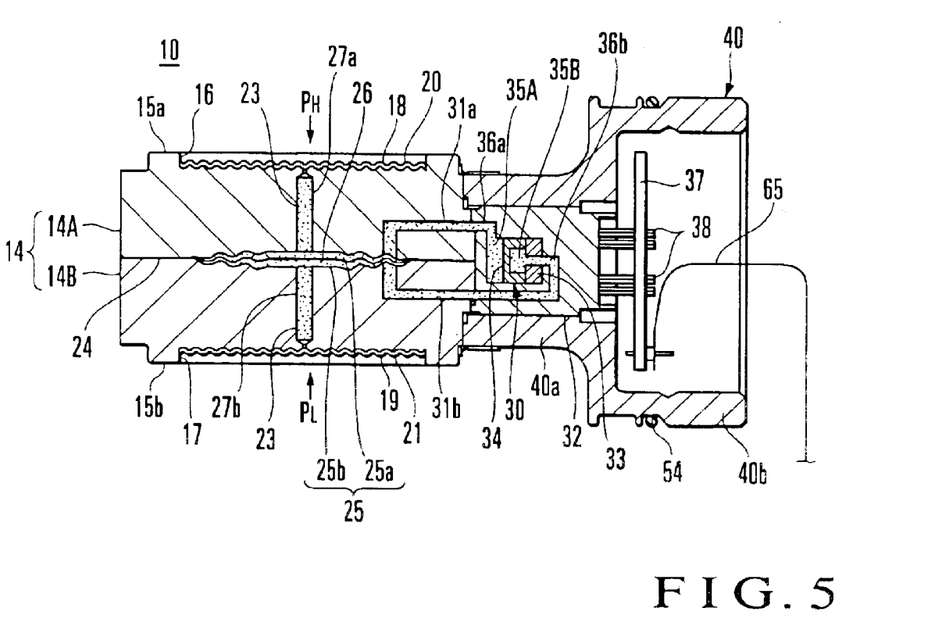
FIG. 5 is a horizontal sectional view of the detecting section shown in FIGS. 1 and 4.

As shown in FIG. 5, the detecting section 10 is constituted by a body main body 14 having recesses 16 formed at the centers of its two side surfaces 15a and 15b, respectively, and side-pressure barrier diaphragms 18 and 19 covering the recesses 16 and 17, respectively.

The sealed spaces defined between the recesses 16 and 17 and barrier diaphragms 18 and 19 form barrier diaphragm chambers 20 and 21 in which a sealed liquid 23 such as silicone coil serving as a pressure transmitting medium is sealed. An inner chamber 25 is defined between bonding surfaces 24 of bodies 14A and 14B. The inner chamber 25 is partitioned by a center diaphragm 26, which forms an excessive-pressure protecting mechanism together with the barrier diaphragms 18 and 19, into two center diaphragm chambers 25a and 25b. The center diaphragm chambers 25a and 25b and barrier diaphragm chambers 20 and 21, in each of which the sealed liquid 23 is sealed, communicate with each other through communication channels 27a and 27b.

Sealed liquid circuits 31a and 31b which connect the center diaphragm chambers 25a and 25b to a pressure sensor 30 are further formed in the body main body 14.

The pressure sensor 30 is disposed in a header 32 integrally projecting from the outer surface of the body main body 14. The pressure sensor 30 has a base 33 and a sensor diaphragm 34 which is bonded to the base 33 to partition the sensor chamber into two sensor chambers 35A and 35B. The high-pressure-side sensor chamber 35A communicates with the center diaphragm chamber 25a through the sealed liquid circuit 31a and a communication hole 36a which is formed in the header 32. The low-pressure-side sensor chamber 35B communicates with the center diaphragm chamber 25b through the sealed liquid circuit 31b and a communication hole 36b which is formed in the header 32 and base 33. The sealed liquid 23 is sealed in the sensor chambers 35A and 35B and communication holes 36a and 36b.

A diffusion gauge serving as a piezoelectric resistor is formed on one surface of the sensor diaphragm 34, i.e., on that surface which faces one of the sensor chambers 35A and 35B that are in contact with the sealed liquid 23. The diffusion gauge is connected to a printed wiring board 37 through lead wires, lead pins 38, and the like. A signal processing circuit which processes a detection signal output from the pressure sensor 30 by arithmetic operation is mounted on the printed wiring board 37. The pressure sensor 30 is not limited to a piezoelectric resistor type sensor, but can be a capacitance type sensor.

A cylinder body 40 which constitutes the attaching portion of the transmitting section 11 is arranged around the header 32. The cylinder body 40 is constituted by a cylindrical neck 40a which can fit with the header 32, and an annular accommodating portion 40b integrally formed with the neck 40a to accommodate the printed wiring board 37. That end portion of the neck 40a which is opposite to the accommodating portion 40b is fixed to the outer surface of the body main body 14 by welding.

Figure 6:
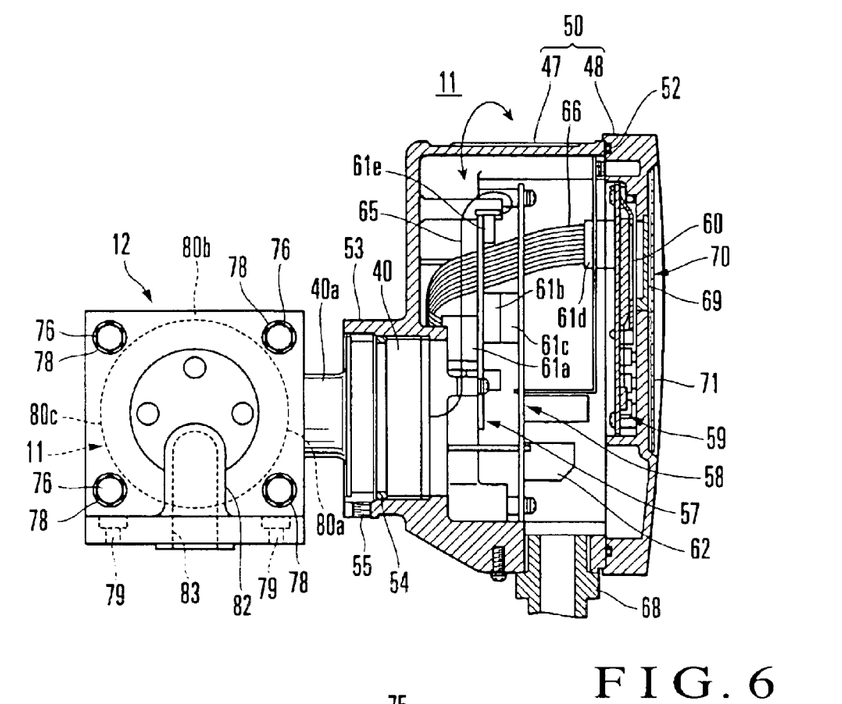
FIG. 6 is a sectional view of the transmitting section shown in FIG. 1.

As shown in FIG. 6, the transmitting section 11 has a vertically elongated box-type case 47 having an opening in its front surface, and a lid 48 attached to the opening of the front surface of the case 47 through a gasket 52 to be openable/closeable. The case 47 and lid 48 make up a transmitting section housing 50. The case 47 has a cylindrical connecting portion 53 integrally projecting from the lower portion of its rear surface. The connecting portion 53 pivotally fits on the outer surface of the cylinder body 40 through an O-ring 54, and is fixed by a set screw 55. The set screw 55 is screwed into a screw hole formed in the lower surface of the connecting portion 53, and its distal end portion is urged against the outer surface of the cylinder body 40. Thus, the set screw 55 inhibits the pivotal motion of the transmitting section 11.

When the set screw 55 is loosened, the transmitting section 11 becomes pivotal about the axis of the cylinder body 40, i.e., can change its angle with respect to the detecting section 10. Thus, the transmitting section 11 can be tilted by a required angle, can be set sideways at 90° (horizontally), or can be pivoted through 180° to be upside down. The axis of the transmitting section 11 is perpendicular to the axis of the detecting section 10.

Two printed wiring boards 57 and 58 are disposed in the case 47 to be parallel to each other at a predetermined gap from each other. A liquid crystal display 60 serving as a meter, and a printed wiring board 59 are disposed in the lid 48. Connectors 61a to 61e, a terminal block 62, and various types of electronic components (not shown) such as a resistor and IC are mounted on the printed wiring boards 57, 58, and 59. As shown in FIG. 6, the printed wiring board 57 is electrically connected to the printed wiring board 37 through a flexible printed board 65. The printed wiring boards 57 and 59 are electrically connected through a plurality of electrical wires 66, and the printed wiring boards 57 and 58 are electrically connected through the connectors 61b and 61c.

Three cable grounds 68, into each one of which one end of a power supply or output cable (not shown) is to be inserted, are attached to the lower surface of the case 47. The power supply and output cables are connected to the terminals (not shown) of the terminal block 62, and are electrically connected to the printed wiring board 58.

An opening 69 is formed in the surface of the lid 48 to correspond to the liquid crystal display 60. The opening 69 is covered with a transparent acrylic plate 70. A display plate 71 is disposed on the surface of the lid 48.

Figure 7:
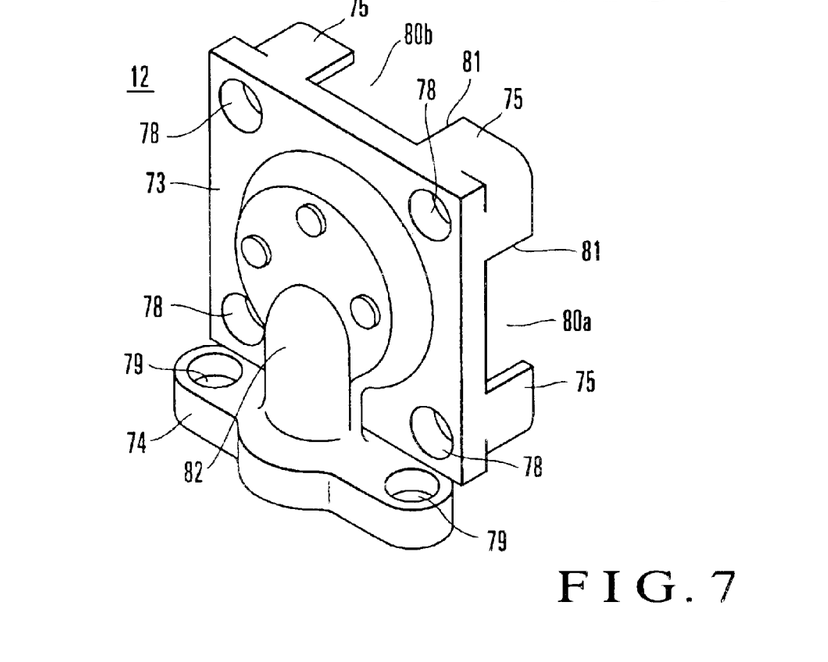
FIG. 7 is an outer appearance perspective view of a pressure introducing cover shown in FIGS. 1, 4, and 6.
Figure 8:
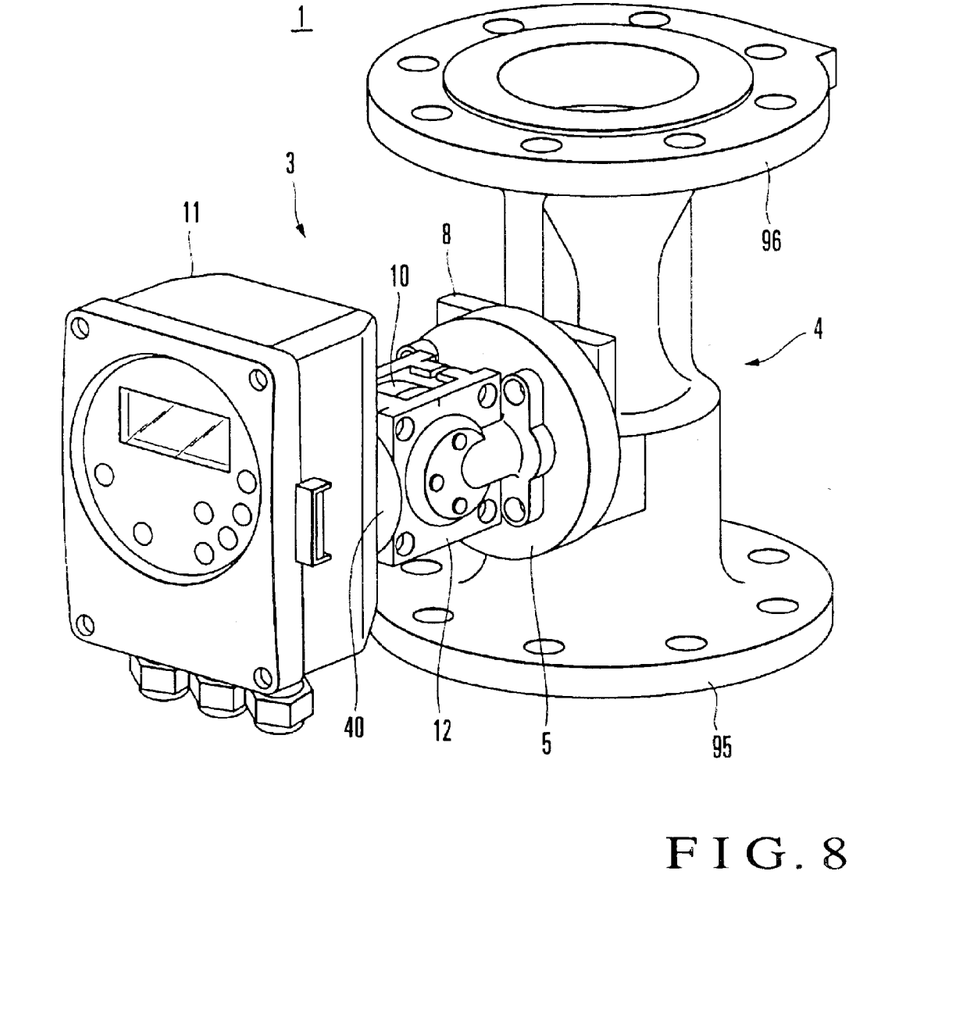
FIG. 8 is an outer appearance perspective view of a restricting flow meter according to the second embodiment of the present invention which is installed vertically.

The pair of covers 12 are made of a metal such as SUS, and cover the respective side surfaces 15a and 15b (FIG. 5) of the body main body 14, so that they transmit pressure to the barrier diaphragms 18 and 19 (FIG. 5). As shown in FIG. 7, each cover 12 is constituted by a square vertical plate 73, a fixing plate 74 integrally, continuously connected to the lower end side of the vertical plate 73, and four L-shaped bent pieces 75 integrally projecting from the respective corners of the inner side surface of the vertical plate 73. Bolt attaching holes 78 through which bolts 76 are to be inserted are formed at the four corners of the vertical plate 73.

The fixing plate 74 is formed into the shape of a letter L so that it is perpendicular to the vertical plate 73, and bolt attaching holes 79 through which the bolts 9 (FIG. 3) are to be inserted are formed at the two end portions of the fixing plate 74. A thick-walled channel forming portion 82 integrally projects from the center of the upper surface of the fixing plate 74 to extend upward along the outer surface of the vertical plate 73. A pressure introducing hole 83 (FIG. 4) is formed in the thick wall of the channel forming portion 82. The pressure introducing hole 83 has an upper end that opens to substantially the center of the inner surface of the vertical plate 73, and a lower end that opens to the lower surface of the fixing plate 74.

Figure 4:
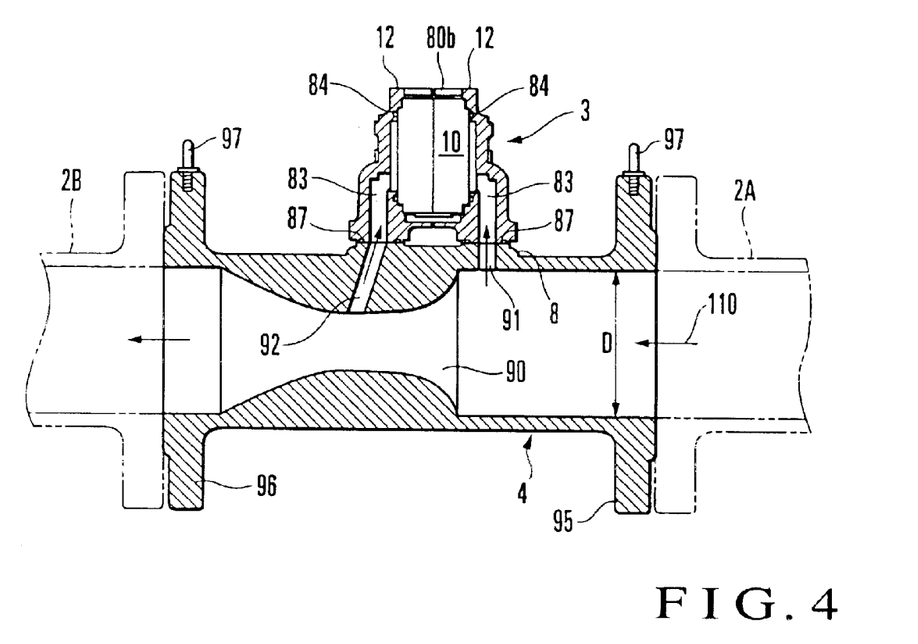
FIG. 4 is a sectional view taken along the line IV—IV of FIG. 3.

The vertical plate 73 of each cover 12 formed in this manner is brought into tight contact with the outer peripheral edge of the side surface 15a or 15b of the body main body 14 through an O-ring 84 (FIG. 4). The four bolts 76 inserted in the respective bolt attaching holes 78 are threadably engaged with the female threads of the covers 12, so that the body main body 14 is held such that it's angle can be changed. In this state, the fixing plate 74 is brought into tight contact with the cover fixing portion 8 of the straight pipe 3 through a seal member 87, and is fixed to the cover fixing portion 8 with the bolts 9 inserted in the bolt attaching holes 79. Note that the bolts 9 are used in two for each cover 12. Thus, a total of four bolts 9 are used.

When the covers 12 are attached to the two side surfaces of the body main body 14, the four L-shaped bent pieces 75 of one cover 12 closely oppose those of the other cover 12 to cover part of the outer surface of the body main body 14, thus forming openings 80a to 80c between the adjacent bent pieces 75. More specifically, recesses 81 are formed between the bent pieces 75 that are adjacent in the horizontal and vertical directions. When the covers 12 are attached to the two side surfaces of the body main body 14, and the bent pieces 75 of one cover 12 and those of the other cover 12 are set to closely oppose each other, the three rectangular openings 80a to 80c are formed by the opposing recesses 81.

Figure 3:
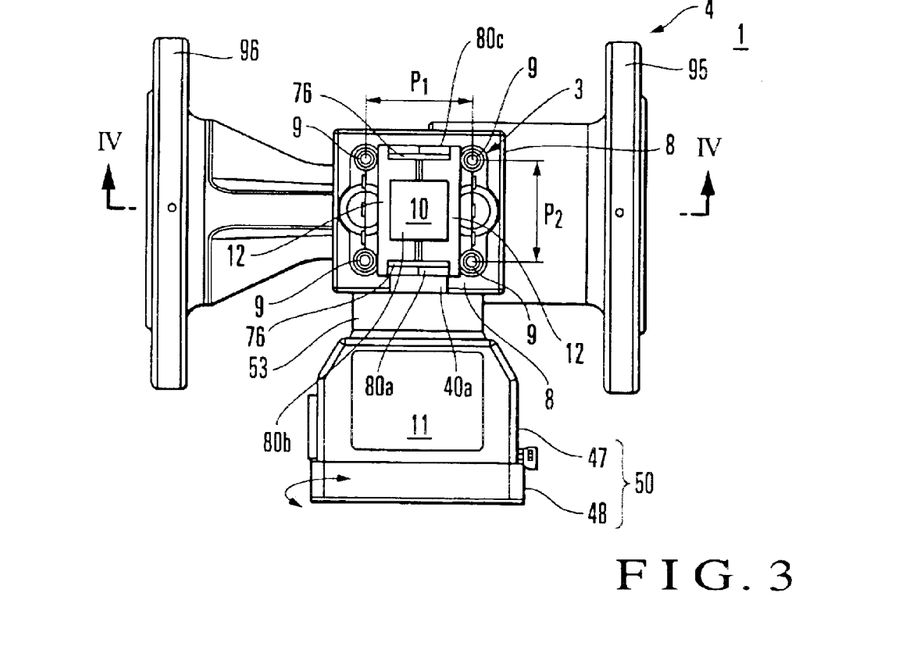
FIG. 3 is a plan view of the restricting flow meter shown in FIG. 1.

The openings 80a to 80c are larger than the sectional shape of the neck 40a of the cylinder body 40, and open forward, upward, and backward of the covers 12, as shown in FIG. 3, so that they allow the neck 40a of the cylinder body 40 to project. For example, in installation to the horizontal pipelines 2A and 2B (horizontal installation), if the transmitting section 11 is to be attached such that it faces forward, the neck 40a of the cylinder body 40 may be set to project through the front opening 80a. If the transmitting section 11 is to be attached such that it faces upward, the detecting section 10 may be rotated through 90° about its axis, and the neck 40a of the cylinder body 40 may be set to project through the upper opening 80b. If the transmitting section 11 is to be attached such that it faces backward, the detecting section 10 may be further rotated through 90° about its axis, and the neck 40a of the cylinder body 40 may be set to project through the rear opening 80c.

As shown in FIG. 4, the pipe body 4 has the cover fixing portion 8 to which the pair of covers 12 are to be fixed, and a throat 90 in its interior to substantially correspond to the cover fixing portion 8. The pipe body 4 has an inner diameter D throughout its entire length excluding its throat 90 portion. The pipe body 4 has flanges 95 and 96, to be flange-connected to the pipelines 2A and 2B, at its two ends. Lifting eye bolts 97 are attached to the upper surfaces of the flanges 95 and 96 by threadable engagement. Projections 98 (FIG. 1) for preventing rolling integrally project from the lower surface of the flanges 95 and 96.

The cover fixing portion 8 is arranged at the center of the upper surface of the pipe body 4. The upper surface of the cover fixing portion 8 where the covers 12 are to be placed is a horizontal flat surface, and has first and second pressure extracting ports 91 and 92 which extend through the pipe wall of the pipe body 4. The pressure extracting ports 91 and 92 are formed separate from each other in the axial direction of the pipe body 4. In horizontal installation in which the pipelines 2A and 2B are horizontal and the covers 12 are fixed to oppose each other in the axial direction of the pipe body 4, the pressure introducing holes 83 of the respective covers 12 are connected directly to the pressure extracting ports 91 and 92. More specifically, the outer openings of the first and second pressure extracting ports 91 and 92 have the same pitch as that of the pressure introducing holes 83 of the covers 12. The first pressure extracting port 91 is located more upstream of the throat 90 and is formed vertically. The second pressure extracting port 92 is formed obliquely such that its inner opening end opens to the center of the interior of the throat 90.

Figure 9:
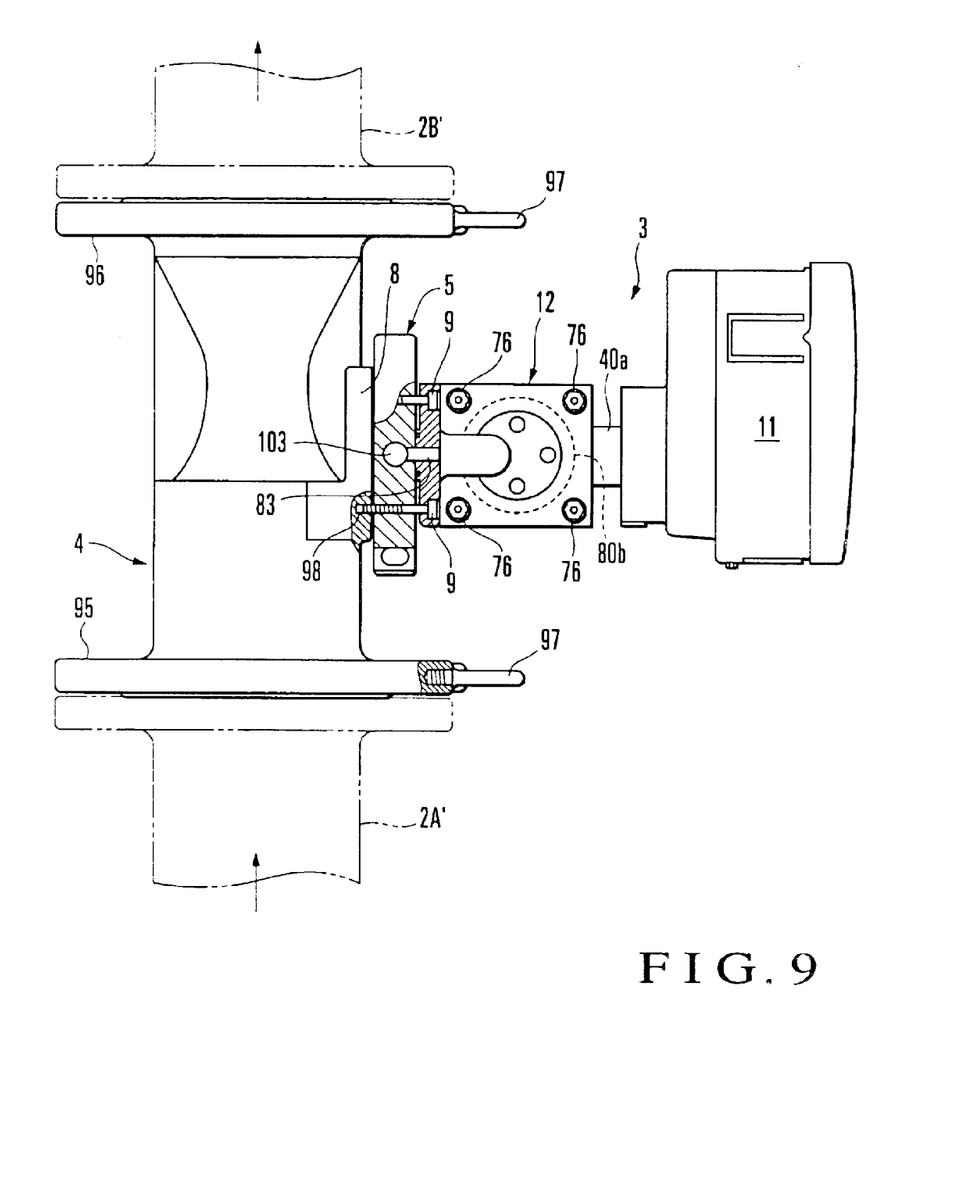
FIG. 9 is a sectional side view showing the main part of the restricting flow meter which is installed vertically.

Four screw holes 98 (FIG. 9) in which the four bolts 9 for fixing the covers 12 are to be screwed into are formed in the upper surface of the cover fixing portion 8. The screw holes 98 are arranged to form a square such that all pitches $P_1$ and $P_2$ (FIG. 3) of the screw holes 98 that are adjacent in the axial direction and a direction perpendicular to it of the pipe body 4, i.e., in the vertical and horizontal directions, are equal ($P_1=P_2$). Therefore, when the body main body 14 is clamped or held by the pair of covers 12, the center-to-center distances of the four bolt inserting holes 79 are equal to each of the pitches $P_1$ and $P_2$, thus forming a square.

In this manner, since the four screw holes 98 and bolt inserting holes 79 are arranged to form squares having the same pitch, even when the covers 12 are rotated through 90° or 180° in either one of the left and right directions in the horizontal plane, the bolt inserting holes 79 and the screw holes 98 coincide with each other. Thus, the pair of covers 12 can be fixed to the cover fixing portion 8 reliably. Consequently, the transmitting section 11 can be installed in any one of the four directions in the horizontal plane, i.e., to face forward, the upstream side, the downstream side, or backward of the restricting flow meter 1.

A restricting flow meter according to the second embodiment of the present invention will be described with reference to FIGS. 8 to 11D.

If a restricting flow meter 1 in the horizontal installation state identical to that shown in FIG. 1 is installed such that the axis of a pipe body 4 is vertical, that is, if it is installed vertically as it is, its barrier diaphragms 18 and 19 (FIG. 5) become horizontal. In this case, the gravity of the process fluid accumulated on the upper surface of the upper barrier diaphragm 18 deforms the barrier diaphragm 18 to cause a measurement error. In order to solve this problem, a body main body 14 and covers 12 must be rotated through 90° within a vertical plane and be fixed to a cover fixing portion 8 of the pipe body 4, so that the barrier diaphragms 18 and 19 become vertical in the same manner as in horizontal installation.

In this case, if the covers 12 are rotated through 90° and are fixed to the cover fixing portion 8 directly, pressure introducing holes 83 are shifted from first and second pressure extracting ports 91 and 92 by 90° and cannot be connected to the first and second pressure extracting ports 91 and 92. For this reason, as shown in FIGS. 8 to 10B, in vertical installation for vertical pipelines 2A' and 2B', an adapter 5 is interposed between the covers 12 and the cover fixing portion 8. A detecting section 10 is held by the covers 12 such that a cylinder body 40 is horizontal and a neck 40a projects forward through an opening 80b of the covers 12, and a transmitting section 11 is directed forward of the detecting section 10. In this case, if the detecting section 10 is vertically pivoted through 90° on the vertical plane, the transmitting section 11 abuts against a flange 96 or 95 of the pipe body 4. Thus, the angle of the detecting section 10 cannot be changed upward or downward with respect to the covers 12.

Figure 11A:
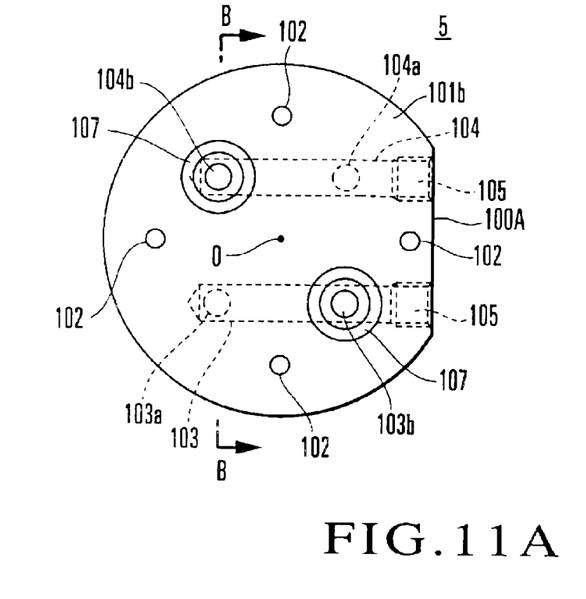
FIG. 11A is a front view of an adapter.
Figure 11B:
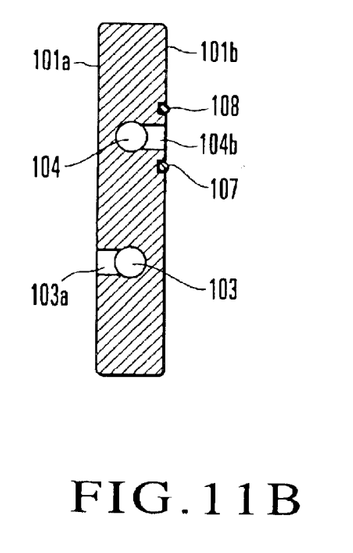
FIG. 11B is a sectional view of the adapter taken along the line B—B of FIG. 11A, and FIGS. 11C and 11D are rear and side views, respectively, of the adapter.
Figure 11C:
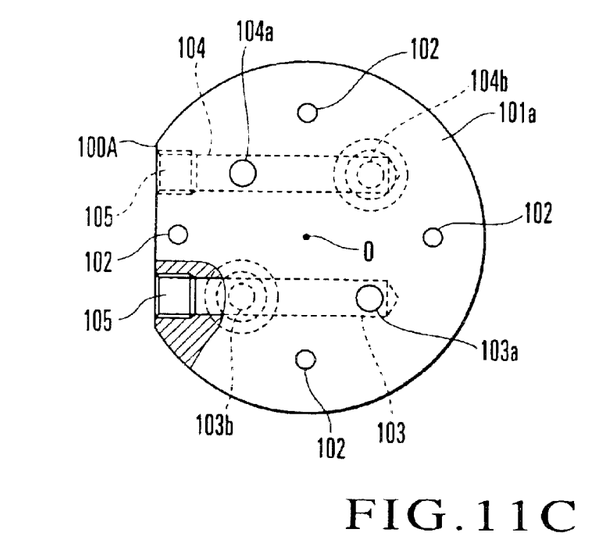

As shown in FIGS. 11A and 1C, the adapter 5 is formed of a D-shaped circular disk with a flat surface 100A on part of its circumferential surface, and has four bolt holes 102 extending through upper and lower surfaces 101a and 101b and two communication holes 103 and 104 formed in the planar direction. The upper surface 110a of the adapter 5 is where the covers 12 are to be installed, and the lower surface 101b of the adapter 5 is the surface that is to come into tight contact with the cover fixing portion 8. The four bolt holes 102 are formed with a constant interval on one circumference having a center O of the adapter 5 as the center, and bolts 9 are inserted in the bolt holes 102.

Figure 11D:
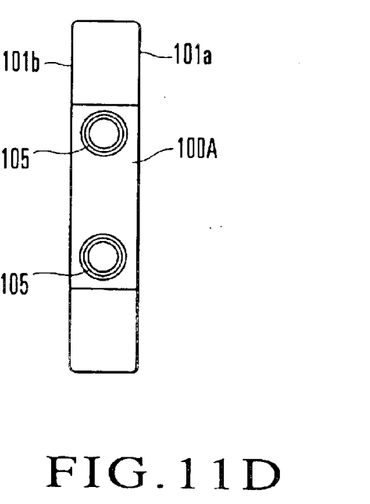

The communication holes 103 and 104 allow the pressure introducing holes 83 of the respective covers 12 and the first and second pressure extracting ports 91 and 92 to communicate with each other, and are formed in the flat surface 100A on the two sides of the center O to serve as blind holes of the same length which are separate from the center O by the same distance. The communication hole 103 has openings 103a and 103b which open to the upper and lower surfaces 101a and 101b, respectively, of the adapter 5. The communication hole 104 has openings 104a and 104b which open to the upper and lower surfaces 101a and 101b, respectively, of the adapter 5. The openings formed in the flat surface 100A are hermetically sealed by plug screws 105, as shown in FIG. 11D. The openings 103a and 104a open to the upper surface 101a of the adapter 5, as shown in FIGS. 11B and 11C. The openings 103b and 104b open to the lower surface 101b of the adapter 5, as shown in FIGS. 11A and 11B.

The openings 103a and 103b, and 104a and 104b of the communication holes 103 and 104 are formed on one circumference having the center O of the adapter 5 as the center, but at positions shifted from the bolt holes 102 by 90° in the circumferential direction. Each of the distances from the center O to the openings 103a, 103b, 104a, and 104b is smaller than the distance from the center O to the bolt holes 102. On the lower surface 101b side of the adapter 5, annular grooves 107 are respectively formed around the openings 103b and 104b. O-rings 108 are fitted in the respective annular grooves 107.

Figures 10A, 10B:
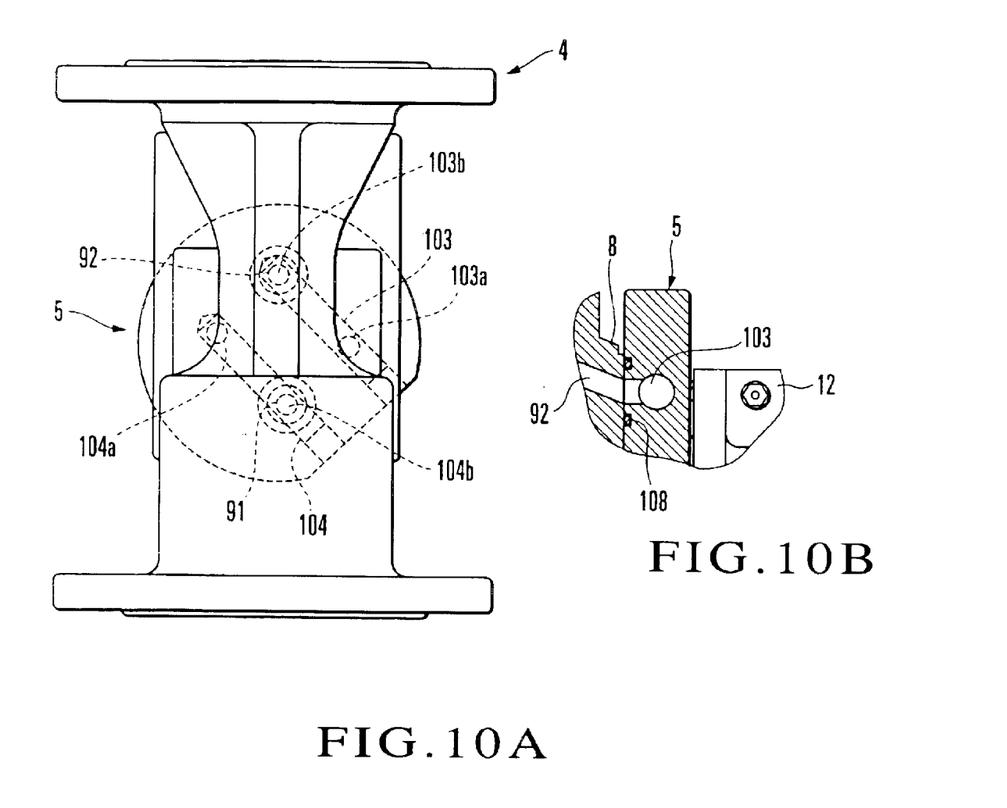
FIGS. 10A and 10B are a rear view and a main part enlarged sectional view, respectively, of a pipe body which is installed vertically.

When the pipe body 4 is arranged vertically such that its high pressure $P_H$ side is on the lower side, the adapter 5 having the above arrangement is used by fixing the body main body 14 and covers 12 to the cover fixing portion 8 such that the transmitting section 11 faces forward. In this case, the adapter 5 is rotated through 45° clockwise in FIG. 11A and the openings 103b and 104b are located on one vertical line, so that an imaginary line connecting the openings 103a and 104a becomes horizontal, as shown in FIG. 10A.

In this state, the adapter 5 is interposed between the covers 12 and the cover fixing portion 8, and both the covers 12 and the adapter 5 are fastened and fixed to the cover fixing portion 8 with the four bolts 9. At this time, one opening 103a of the communication hole 103 communicates with the pressure introducing hole 83 of that cover 12 which is located on the right side when seeing the transmitting section 11 from the front surface. The other opening 103b communicates with the first pressure extracting port 91. One opening 104a of the communication hole 104 communicates with the pressure introducing hole 83 of that cover 12 which is located on the left side when seeing the transmitting section 11 from the front surface. The other opening 104b communicates with the second pressure extracting port 92.

The restricting flow meter 1 having the above structure is installed horizontally, usually by connecting the pipe body 4 to horizontal pipelines 2A and 2B through flanges. In this horizontal installation, when a process fluid 110 flows in the pipe body 4, the fluid pressure changes before and after a throat 90. At this time, part of the process fluid 110 which is more upstream (high pressure $P_H$ side) of the throat 90 flows through the first pressure extracting port 91 and the pressure introducing hole 83 of the upstream cover 12 and is supplied to the high-pressure-side barrier diaphragm 18 (FIG. 5). Part of the process fluid 110 which flows through the throat 90 (low pressure $P_L$ side) flows through the second pressure extracting port 92 and the pressure introducing hole 83 of the downstream cover 12 and is supplied to the low-pressure-side barrier diaphragm 19.

When a high pressure $P_H$ and low pressure $P_L$ of the process fluid 110 are applied to the low- and high-pressure-side barrier diaphragms 18 and 19, the two diaphragms 18 and 19 displace in accordance with a differential pressure $\Delta P$ ($=P_H-P_L$). The differential pressure $\Delta P$ is applied to a sensor diaphragm 34 of a pressure sensor 30 through a sealed liquid 23. The sensor diaphragm 34 is distorted in accordance with the differential pressure $\Delta P$. When this distortion is extracted as an electrical signal, the differential pressure $\Delta P$ is measured. The differential pressure $\Delta P$ is subjected to an arithmetic process based on the following equation, so that a flow rate Q of the process fluid 110 flowing in the pipe body 4 is measured:

$$Q = F\sqrt{\frac{\Delta P \cdot T_1}{\Delta PSPAN \cdot P_1}} \qquad (1)$$

where F is a scale factor, $T_1$ is a designed temperature of the fluid, $P_1$ is a designed high-pressure-side output, $\Delta P$ is a generated differential pressure, and $\Delta$ PSPAN is a differential pressure corresponding to a flow rate range 100 Nm³/h. In vertical installation as well, the flow rate Q can be measured completely in the same manner as in horizontal installation.

With the restricting flow meter 1 having the above structure, since the attaching angles of the detecting section 10, transmitting section 11, and pipe body 4 can be changed freely, the restricting flow meter 1 can be installed in an optimal state in accordance with the state of the installation site, the piping state, and the like. More specifically, the two side surfaces of the detecting section 10 are held by the pair of covers 12. When the four bolts 76 (FIG. 6) are removed, the detecting section 10 becomes pivotal about its axis. Therefore, when the neck 40a of the cylinder body 40 is set to project from an opening 80a, the opening 80b, or an opening 80c of the pair of covers 12, the angle of the detecting section 10 can be changed by 90° or 180°. As a result, the transmitting section 11 can be changed in three directions, i.e., to face forward, upward, or backward.

Alternatively, if the angle of the detecting section 10 with respect to the covers 12 is not changed but only the pipe body 4 is rotated through 90° about its axis and is connected to the pipelines 2A and 2B, the transmitting section 11 can be changed to face upward or downward. If the pipe body 4 is rotated through 180°, the transmitting section 11 can be changed to face backward. When the pipe body 4 is rotated through 180°, it is turned upside down. In this case, the transmitting section 11 may be rotated through 180° with respect to the cylinder body 40, so that the pipe body 4 is restored to the initial normal state.

When the neck 40a of the cylinder body 40 is set to project upward from the opening 80b of the pair of covers 12 so the transmitting section 11 faces horizontally upward, and the neck 40a is pivoted through a desired angle about the axis of the cylinder body 40, the meter reading direction can be changed freely within a horizontal plane.

In the embodiments described above, bolt inserting holes 79 of fixing plates 74 of the pair of covers 12 comprise a total of four holes 79, and bolt screw holes 98 of the cover fixing portion 8 comprise a total of four holes 98. The holes 79 and 98 are arranged to form squares in which all the pitches of the vertically and horizontally adjacent holes are equal ($P_1=P_2$). Thus, as particularly shown in FIG. 9, in vertical installation for the vertical pipelines 2A' and 2B', the covers 12 are attached after they are rotated through 90° such that the barrier diaphragms 18 and 19 and a center diaphragm 26 become vertical.

At this time, the bolt inserting holes 79 and bolt screw holes 98 do not shift from each other, and the covers 12 can be reliably fixed to the cover fixing portion 8 in the same manner as in horizontal installation. In this case, the pressure introducing holes 83 of the pair of covers 12 may undesirably shift from the first and second pressure extracting ports 91 and 92 by 90°. Hence, the adapter 5 may be interposed between the covers 12 and the cover fixing portion 8, and the pressure introducing holes 83 and the first and second pressure extracting ports 91 and 92 may be connected to each other through the communication holes 103 and 104. Such structure of the adapter 5 can be obtained easily.

In the embodiments described above, as the throat 90 of the pipe body 4, a throat, the sectional shape of the inner surface of which is formed of a substantially elliptic curved line, is used. However, the present invention is not limited to this throat, but the restricting flow meter may use a Venturi pipe formed of a straight pipe.

In the embodiments described above, the present invention is applied to the restricting flow meter 1 that measures the flow rate from the differential pressure between two points of the process fluid. The present invention can also be applied to a pressure transmitter that measures the liquid level or the like in the tank with reference to the atmospheric pressure or vacuum pressure as a reference pressure. In this case, no pipe body 4 is needed.

In a restricting flow meter that enables horizontal installation and vertical installation, whether or not the angles of the detecting section 10 and transmitting section 11 can be changed does not matter.

The angle of the detecting section 10 with respect to the covers 12 can be changed by 90°, and the transmitting section 11 can be changed in three directions, i.e., to face forward, upward, and backward. However, the present invention is not limited to this. Depending on the positions of the bolts 76, the transmitting section 11 may be changed by a predetermined angle, i.e., by 45°.

As has been described above, according to the present invention, the transmitting section is attached such that its angle with respect to the detecting section can be changed, and the detecting section is held by the pressure introducing covers such that its angle can be changed. Thus, the directions of the transmitting section, meter, and detecting section can be changed freely, so that installation can be performed in an optimal use state in accordance with the state of the installation site and the arrangement of the pipelines. For example, the reading direction of the meters can be changed to an optimal angle within the angular range of 360° about the connecting portion of the transmitting section and detecting section, or the angle of the detecting section may be changed, so that the transmitting section can be directed forward or upward.

The four bolts that fix the pair of pressure introducing covers to the cover fixing portion of the pipe body are arranged to form a square such that all the pitches of the vertically and horizontally adjacent bolts are equal. Therefore, in vertical installation, only the pair of pressure introducing covers need be rotated through 90° and a simple adapter needs to be interposed between the cover fixing portion and the pressure introducing covers. Thus, the differential pressure/pressure transmitter can be reliably attached not only to horizontal pipelines but also to vertical pipelines. Accordingly, the differential pressure/pressure transmitter itself need not be changed in design, but can be used commonly in both horizontal installation and vertical installation. Also, the adapter is simple in design and can be fabricated at low cost.

What is claimed is:

1. A differential pressure/pressure transmitter comprising:
a detecting section which has a pair of barrier diaphragms in opposing side surfaces thereof and detects a differential pressure of a to-be-measured fluid applied to said pair of barrier diaphragms;
a transmitting section attached to said detecting section; and
a pair of pressure introducing covers which have pressure introducing holes for guiding pressure to said pair of barrier diaphragms and hold the two side surfaces of said detecting section, thus covering said pair of barrier diaphragms,
wherein said detecting section is held by said pair of pressure introducing covers such that an angle thereof is changeable about a center axis thereof, and
said transmitting section is attached such that an angle thereof can be changed about a center axis thereof which is perpendicular to the center axis of said detecting section.

2. A transmitter according to claim 1, further comprising:
a pipe body having a cover fixing portion, on an outer surface thereof, to which said pair of pressure introducing covers are to be fixed; and
an adapter which has two communication holes and is selectively interposed between said pair of pressure introducing covers and said cover fixing portion.

3. A transmitter according to claim 2, wherein
said pair of pressure introducing covers are fixed to said cover fixing portion with two bolts for each cover, i.e., with a total of four bolts,
bolt inserting holes where said bolts of said pair of pressure introducing covers are to be inserted are arranged to form a square such that when said pair of pressure introducing covers hold said detecting section, vertically and horizontally adjacent ones of the inserting holes have the same pitch,
said cover fixing portion has two pressure extracting ports which can communicate with the pressure introducing holes of said pair of pressure introducing covers, and four screw holes where said four bolts are to be screwed into, and
in vertical installation in which said pair of pressure introducing covers are fixed to said cover fixing portion such that the pressure introducing holes are shifted from the pressure extracting holes by a predetermined angle, said adapter is interposed between said pressure introducing covers and said cover fixing section, so that the pressure introducing holes and the pressure extracting ports communicate with each other through the communication holes.

4. A transmitter according to claim 3, wherein the predetermined angle is 90°.

5. A transmitter according to claim 1, wherein said pair of pressure introducing covers have a plurality of openings that enable an attaching direction of said transmitting section with respect to said detecting section to be changed.

6. A transmitter according to claim 3, wherein said pipe body has a throat therein, and a fluid pressure which is more upstream of said throat and a fluid pressure which is more downstream of said throat flow through the pressure extracting ports and are directly guided to the pressure introducing holes of said pair of pressure introducing covers.

7. A differential pressure/pressure transmitter comprising:
a detecting section which has a pair of barrier diaphragms attached to opposing side surfaces thereof and detects a differential pressure of a to-be-measured fluid applied to said barrier diaphragms;
a transmitting section attached to said detecting section;
a pair of pressure introducing covers which have pressure introducing holes for guiding pressure to said pair of barrier diaphragms and hold the two side surfaces of said detecting section, thus covering said pair of barrier diaphragms;
a pipe body having a cover fixing portion, on an outer surface thereof, to which said pair of pressure introducing covers are to be fixed; and an adapter which has two communication holes and is selectively interposed between said pair of pressure introducing covers and said cover fixing portion, wherein said pair of pressure introducing covers are fixed to said cover fixing portion with two bolts for each cover, i.e., with a total of four bolts, bolt inserting holes where said bolts of said pair of pressure introducing covers are to be inserted are arranged to form a square such that when said pair of pressure introducing covers hold said detecting section, vertically and horizontally adjacent ones of the bolt inserting holes have the same pitch, said cover fixing portion has two pressure extracting ports which can communicate with the pressure introducing holes of said pair of pressure introducing covers, and four screw holes where said four bolts are to be screwed into, and in vertical installation in which said pair of pressure introducing covers are fixed to said cover fixing portion such that the pressure introducing holes are shifted from the pressure extracting holes by a predetermined angle, said adapter is interposed between said pressure introducing covers and said cover fixing section, so that the pressure introducing holes and the pressure extracting ports communicate with each other through the communication holes.

8. A transmitter according to claim 7, wherein the predetermined angle is 90°.

9. A transmitter according to claim 7, wherein said pair of pressure introducing covers have a plurality of openings that enable an attaching direction of said transmitting section with respect to said detecting section to be changed.

10. A transmitter according to claim 7, wherein said pipe body has a throat therein, and a fluid pressure which is more upstream of said throat and a fluid pressure which is more downstream of said throat flow through the pressure extracting holes and are guided to the pressure introducing holes of said pair of pressure introducing covers through an adapter.

* * * * *